(No Model.)  
L. WILKERSON.  
CAR BRAKE.

No. 290,379.  Patented Dec. 18, 1883.

WITNESSES:  
Fred. G. Dieterich

INVENTOR.  
Lafayette Wilkerson  
By Louis Bagger & Co.  
ATTORNEYS.

(No Model.) 2 Sheets—Sheet 2.

L. WILKERSON.
CAR BRAKE.

No. 290,379. Patented Dec. 18, 1883.

WITNESSES:
Fred G. Dietrich

INVENTOR.
Lafayette Wilkerson
By Louis Bagger & Co.
ATTORNEYS.

UNITED STATES PATENT OFFICE.

LAFAYETTE WILKERSON, OF SCIPIO, INDIANA.

CAR-BRAKE.

SPECIFICATION forming part of Letters Patent No. 290,379, dated December 18, 1883.

Application filed October 31, 1883. (No model.)

*To all whom it may concern:*

Be it known that I, LAFAYETTE WILKERSON, of Scipio, in the county of Jennings and State of Indiana, have invented certain new and useful Improvements in Car-Brakes; and I do hereby declare that the following is a full, clear, and exact description of the invention, which will enable others skilled in the art to which it appertains to make and use the same, reference being had to the accompanying drawings, which form a part of this specification, and in which—

Figure 1:
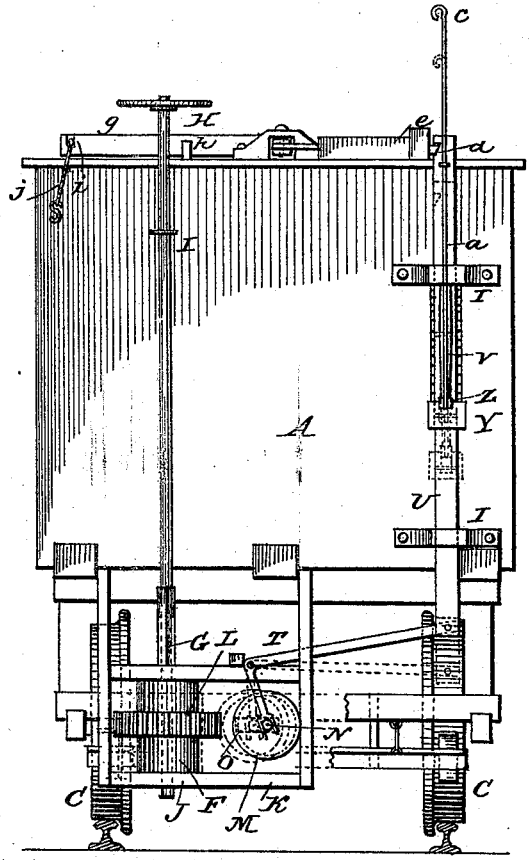
Figure 2:
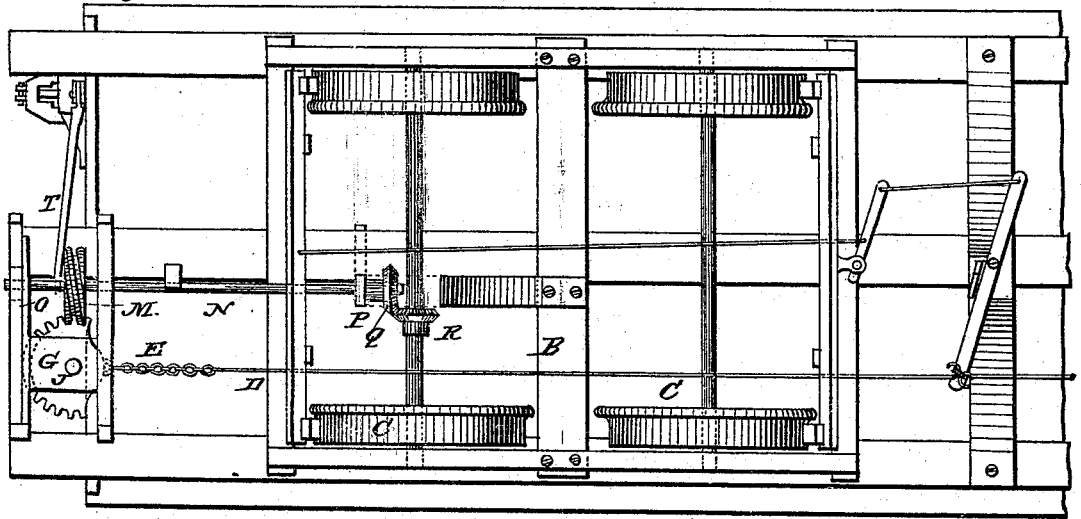
Figure 3:
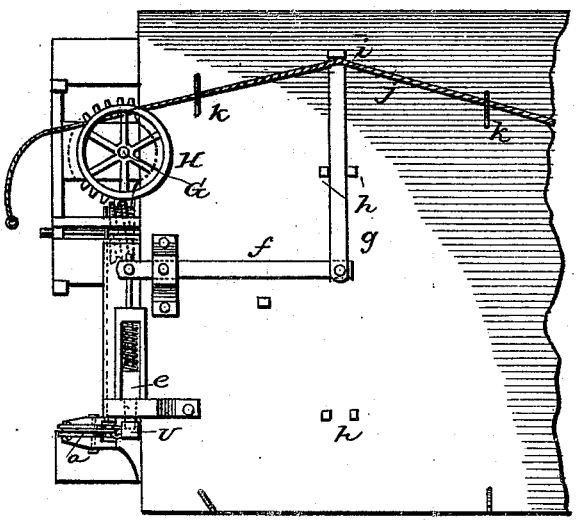
Figure 5:
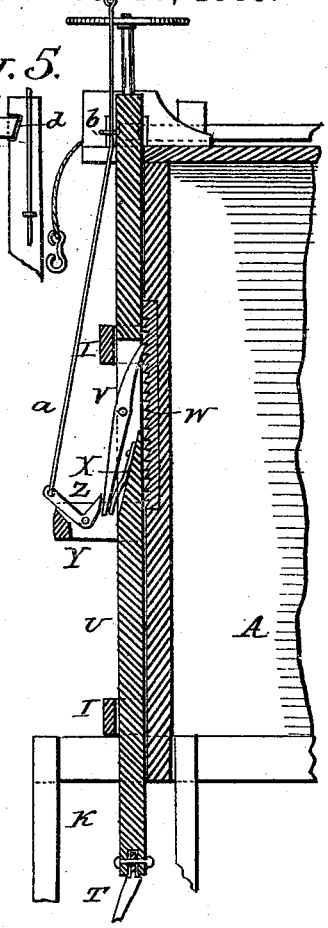
Figure 4:
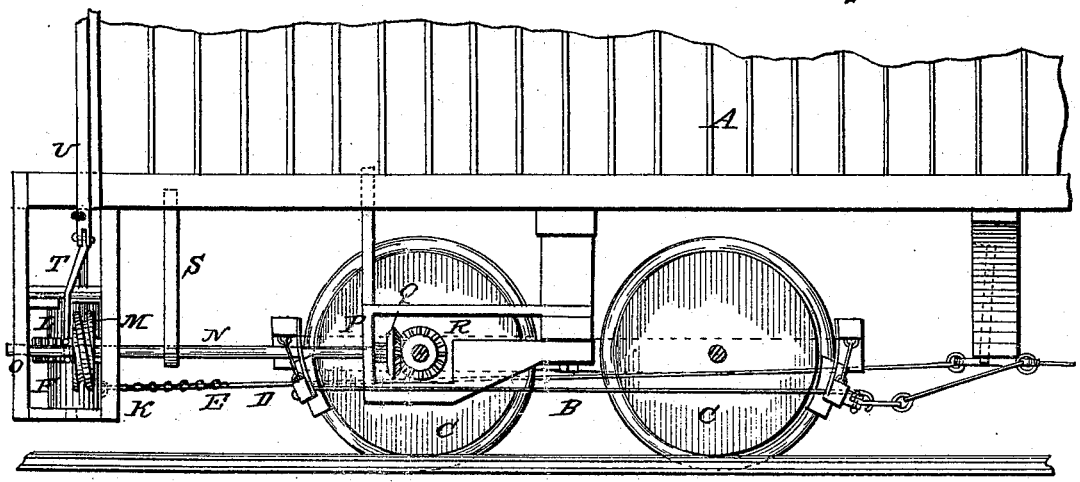

Figure 1 is a view of the end of a railway-car provided with my improved car-brake. Fig. 2 is a bottom view of a portion of the same. Fig. 3 is a top view of a portion of the car. Fig. 4 is a side view of the lower portion of the car and the wheels, with the wheels on one side broken away; and Fig. 5 is a detail view of the mechanism throwing the brake mechanism in and out of gear.

Similar letters of reference indicate corresponding parts in all the figures.

My invention has relation to automatic car-brakes—*i. e.*, car-brakes which are operated by the wheels of the car; and it consists in the improved construction and combination of parts of the same, as hereinafter more fully described and claimed.

In the accompanying drawings, the letter A indicates the body of a box-car, B the truck, and C the wheels, which all may be of any desired construction.

D is the brake-operating rod, one end of which is attached to the end of the brake-chain E, which is secured to and winds around a drum, F, upon the lower end of the upright brake-stem G, which is provided upon its upper end with the usual hand-wheel, H, and which turns in bearings I upon the end of the car and in bearings J in a frame, K, projecting below the platform of the car. A cogged segment, L, of one hundred and eighty degrees, is fastened to the brake-stem above the drum, and a worm or screw, M, secured upon the outer end of a shaft, N, may be brought to engage the said cogged segment. This shaft slides with its outer end in a horizontal slot, O, in the frame K, and turns near its inner end in a bearing, P, near the axle of the first pair of wheels, projecting from the truck of the same, and is provided upon its inner end with a bevel-pinion, Q, which meshes with a similar pinion, R, upon the axle of the first pair of wheels. A spring, S, bears against the side of this horizontal shaft, forcing it and the worm toward the cogged segment, and the bifurcated end of an L-shaped lever, T, pivoted, rocking in a vertical plane in the upper portion of frame K, straddles the shaft between the worm and the outer bearing or slot, and is hinged to the lower end of a rod, U, sliding in vertical bearings upon the end of the car at the outer end of its laterally-projecting arm. This vertically-sliding rod has a longitudinal slot, in which a lever or long pawl, V, is pivoted, engaging with its upper end a series of ratchet-teeth, W, upon the end of a car, and having its lower end forced out by a spring, X, secured at the lower end of the slot. A frame or slotted lug, Y, projects from the front side of the rod at the lower end of the slot, and an L-shaped lever, Z, is pivoted in the same, bearing with one arm against the lower end of the long pawl, and having a rod, *a*, hinged to its other arm, which rod slides in bearings *b* upon the front side of the vertical sliding rod, and has a handle, *c*, upon its upper end, by which it and the slotted rod may be operated. The upper end of the slotted vertically-sliding rod has a notch, *d*, upon one side, which notch is engaged by the end of a spring-bolt, *e*, which end is beveled upon the under side, while the other end is hinged to the end of a lever, *f*, pivoted upon the top of the car at its forward edge, and having a rod, *g*, hinged to the other end, which rod slides in bearings *h* upon the top of the car, and has a notch, *i*, upon its upper side near its outer end, into which notch a rope, *j*, fits, which rope is stretched from one end of the car to the other, and runs through a number of eyes or hooks, *k*, upon the top of the car, having eyes or hooks at its ends by which it may be connected to similar ropes upon adjoining cars. The line in which the rope is stretched is within the notch in the end of the rod, so that when the rope is drawn, being secured at the other end, the rod will be drawn or pushed inward, which again in turn will move the lever and withdraw the bolt, which releases the slotted vertical rod, which slides downward, throwing the worm upon the horizontal shaft into engagement with the segmental cog, causing it, as it is revolved by the revolution of the wheels, to wind the brake-chain upon the drum, stopping the motion of the wheels. In this manner it will be seen that by having a rope stretched from one end of the train to the other the brakes may be set in operation by simply pulling the rope, and by having the rope consisting of sections of the length of the car and connected at the ends by hooks, the rope-sections may remain, each section upon each car, as the cars are separated, in the same manner as the bell-ropes now in use.

Having thus described my invention, I claim and desire to secure by Letters Patent of the United States—

1. The combination of a vertically-sliding rod having a longitudinal slot, a pawl or lever pivoted in the said slot and bearing with its lower end against a spring, forcing it out, an L-shaped lever bearing with one arm against the lower end of the pawl pivoted in a slotted lug at the lower end of the slot in the sliding rod, and a rod sliding in bearings upon the slotted rod, forming a handle at its upper end, and hinged to the other end of the L-shaped lever at its lower end, a vertical row of ratchet-teeth engaged by the upper end of the long pawl or lever, and means for engaging the upper end of the rod, and means attached to its lower end for throwing an automatic brake mechanism into or out of operation, as and for the purpose shown and set forth.

2. The combination of the wheels of a car, the brake mechanism, the brake-rod, the brake-chain, the brake-stem having a drum at its lower end and having a semicircular cogged segment above the drum, a shaft sliding in a horizontal slot with its outer end having a worm near its outer end and a bevel-pinion at its inner end, a beveled pinion secured upon the axle of the first pair of wheels and engaging the pinion upon the horizontal shaft, an L-shaped lever having a bifurcated end straddling the outer portion of the horizontal shaft, a vertical sliding rod hinged at its lower end to the other arm of the L-shaped lever, having a notch in the side of its upper end, and having a rod sliding in bearings upon it and disengaging a pawl, preventing the rod from sliding upward when drawn upward, a spring-bolt engaging the notch in the upper end of the sliding rod, a lever hinged to the inner end of the spring-bolt at one end, a sliding rod hinged at one end to the other end of the aforesaid lever and having a notch at its outer end, a rope passing through the notch and across the full length of the car, and hooks or eyes upon the top of the car, having the rope sliding in them in a line inside the notch in the end of the sliding rod, as and for the purpose shown and set forth.

In testimony that I claim the foregoing as my own I have hereunto affixed my signature in presence of witnesses.

LAFAYETTE WILKERSON.

Witnesses:
    JAMES L. YATES,
    S. H. LEEDS,
    GEORGE F. LAWRENCE.